(12) United States Patent
Khizroev et al.

(10) Patent No.: US 6,898,053 B1
(45) Date of Patent: May 24, 2005

(54) PERPENDICULAR RECORDING HEAD WITH TRACKWIDTH DEFINED BY PLATING THICKNESS

(75) Inventors: Sakhrat Khizroev, Pittsburgh, PA (US); Dmitri Litvinov, Pittsburgh, PA (US); Bill Crue, Pittsburgh, PA (US); Nurul Amin, Saint Paul, MN (US); Robert Earl Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 492 days.

(21) Appl. No.: 09/695,679

(22) Filed: Oct. 24, 2000

Related U.S. Application Data
(60) Provisional application No. 60/161,690, filed on Oct. 26, 1999.

(51) Int. Cl.$^7$ .............................................. G11B 5/147
(52) U.S. Cl. ...................................................... 360/126
(58) Field of Search ............................... 360/125, 126, 360/127

(56) References Cited

U.S. PATENT DOCUMENTS

| | | |
|---|---|---|
| 2,927,163 A | 3/1960 | Brower |
| 3,805,291 A | 4/1974 | Sakurai |
| 3,813,766 A | 6/1974 | Brock et al. |
| 4,001,890 A | 1/1977 | Kayser |
| 4,078,300 A | 3/1978 | Lazzari |
| 4,138,702 A | 2/1979 | Magnenet |
| 4,219,855 A | 8/1980 | Jones, Jr. |
| 4,404,609 A | 9/1983 | Jones, Jr. |
| 4,423,450 A | 12/1983 | Hamilton |
| 4,438,471 A | 3/1984 | Oshiki et al. |
| 4,441,131 A | 4/1984 | Osanai |
| 4,541,026 A | 9/1985 | Bonin et al. |
| 4,546,398 A | 10/1985 | Toda et al. |

(Continued)

FOREIGN PATENT DOCUMENTS

| | | |
|---|---|---|
| GB | 1344890 | 1/1974 |
| JP | 59231720 | 12/1884 |
| JP | 56087218 | 7/1981 |
| JP | 59195311 | 11/1984 |
| JP | 2001-148107 | 5/2001 |

OTHER PUBLICATIONS

Khizroev et al., *Considerations in the Design of Probe Heads for 100 Gbit/in$^2$ Recording Density*, IEEE Transaction of Magnetics, Sep. 1997, vol. 3, No. 5, pp. 2893–2895.
Toigo, *Avoiding a Data Crunch*, Scientific American, May 2000, pp. 58–74, IEEE Press.
U.S. Appl. No. 09/726,157, filed Nov. 29, 2000, Litvinov et al.
U.S. Appl. No. 09/809,118, filed Mar. 15, 2001, Crue et al.

*Primary Examiner*—David Davis
(74) *Attorney, Agent, or Firm*—Alan G. Towner, Esq.; Pietragallo, Bosick & Gordon

(57) ABSTRACT

A perpendicular recording head for use with magnetic recording media includes an unusually thin main pole. The main pole is made by depositing magnetically permeable material on a nonmagnetic substrate. The main pole is then magnetically coupled with an opposing pole so that the deposited magnetically permeable material is oriented parallel to the recording head's direction of travel.

9 Claims, 7 Drawing Sheets

U.S. PATENT DOCUMENTS

| | | | |
|---|---|---|---|
| 4,575,777 A | 3/1986 | Hosokawa | |
| 4,613,918 A | 9/1986 | Kanai et al. | |
| 4,631,612 A | 12/1986 | Shiiki et al. | |
| 4,639,810 A | 1/1987 | Sakai | |
| 4,649,449 A | 3/1987 | Sawada et al. | |
| 4,652,956 A | 3/1987 | Schewe | |
| 4,672,494 A | 6/1987 | Furuya et al. | |
| 4,703,382 A | 10/1987 | Schewe et al. | |
| 4,731,157 A | 3/1988 | Lazzari | |
| 4,742,413 A | 5/1988 | Schewe | |
| 4,763,215 A | 8/1988 | Gueugnon et al. | |
| 4,837,924 A * | 6/1989 | Lazzari | 29/603.14 |
| 4,839,761 A | 6/1989 | Gatzen | |
| 4,860,139 A | 8/1989 | Hamilton | |
| 4,873,599 A | 10/1989 | Sueoka | |
| 4,943,882 A | 7/1990 | Wada et al. | |
| 4,951,166 A * | 8/1990 | Schewe | 360/119 |
| 4,974,110 A | 11/1990 | Kanamine et al. | |
| 4,985,792 A | 1/1991 | Boir | |
| 5,016,342 A | 5/1991 | Pisharody et al. | |
| 5,027,246 A | 6/1991 | Numazawa et al. | 360/126 |
| 5,068,959 A | 12/1991 | Sidman | |
| 5,073,836 A | 12/1991 | Gill et al. | |
| 5,196,976 A | 3/1993 | Lazzari | |
| 5,225,953 A | 7/1993 | Wada et al. | |
| 5,241,430 A | 8/1993 | Janz | |
| 5,305,516 A | 4/1994 | Imazeki et al. | |
| 5,372,698 A | 12/1994 | Liao | |
| 5,430,589 A | 7/1995 | Moir et al. | |
| 5,606,478 A | 2/1997 | Chen et al. | |
| 5,680,283 A * | 10/1997 | Tanaka et al. | 360/125 |
| 5,687,046 A | 11/1997 | Mathews | 300/126 |
| 5,738,927 A | 4/1998 | Nakamura et al. | |
| 5,796,557 A | 8/1998 | Bagnell et al. | |
| 5,812,350 A | 9/1998 | Chen et al. | |
| 5,864,450 A | 1/1999 | Chen et al. | |
| 5,920,979 A | 7/1999 | Nepela et al. | |
| 5,942,342 A | 8/1999 | Hikosaka et al. | |
| 5,995,341 A | 11/1999 | Tanaka et al. | 360/125 |
| 5,996,045 A | 11/1999 | Lee et al. | |
| 6,560,069 B1 | 5/2003 | Litvinov et al. | 360/126 |
| 2001/0022712 A1 | 9/2001 | Funayama et al. | |
| 2001/0027603 A1 | 10/2001 | Komuro et al. | |

\* cited by examiner

PERPENDICULAR RECORDING HEAD WITH TRACKWIDTH DEFINED BY PLATING THICKNESS

CROSS REFERENCE TO RELATED APPLICATION

This application claims the benefit of U.S. Provisional Patent Application No. 60/161,690, filed Oct. 26, 1999.

BACKGROUND OF THE INVENTION

1. Field of the Invention

The invention is a perpendicular recording head for use with magnetic storage media. The perpendicular recording head has an unusually thin main pole for concentrating the magnetic flux over a smaller portion of the magnetic storage medium's surface area than current perpendicular recording heads.

2. Description of the Related Art

Although other perpendicular recording heads have been developed, the present invention improves upon presently known perpendicular recording heads by utilizing a main pole made by plating a magnetically permeable material over a nonmagnetic substrate, thereby permitting an unusually thin main pole to be produced.

An example of a magnetic recording head is described in U.S. Pat. No. 4,078,300, issued to J. P. Lazzari on Mar. 14, 1978. This patent describes a method of making a magnetic recording head intended to work in conjunction with a track of a magnetic storage medium having a narrow width. The method involves removing material from the edges of the pole tip to reduce the surface area of the main pole's bottom surface.

U.S. Pat. No. 4,138,702, issued to J. G. Magnenet on Feb. 6, 1979, describes a head arrangement for perpendicular recording on a magnetic record carrier. The head arrangement has an electromagnet with a core and a magnetic shunt on opposite sides of the magnetic recording medium.

U.S. Pat. No. 4,546,398, issued to J. Toda et al. on Oct. 8, 1985, describes a perpendicular recording head. The perpendicular recording head includes a main pole made from a thin magnetic film, and a spiral coil electromagnetically coupled to the main pole.

U.S. Pat. No. 4,652,956, issued to H. Schewe on Mar. 24, 1987, describes a recording head for perpendicular magnetization. The recording head has a pair of magnetic legs forming a ring-shaped member, and separate read and write wire coils. The read coil is located between the two magnetic legs, and the write coil is located outside one of the two magnetic legs.

U.S. Pat. No. 4,731,157, issued to J. P. Lazzari on Mar. 15, 1988, describes a process for making a perpendicular recording head. The process includes the steps of depositing magnetic film on an insulating substrate, etching a channel in the magnetic film for containing a coil within a dielectric material, etching another channel in the dielectric layer for containing a second magnetic film, removing dielectric material to expose the lateral edge of the second magnetic film, and depositing additional dielectric material on top of the second magnetic film.

U.S. Pat. No. 4,943,882, issued to T. Wada et al. on Jul. 24, 1990, describes a perpendicular recording head. The recording head includes a first main pole surrounded by a conductor coil, with an insulator covering the first main pole and coil. The first main pole is in contact with a magnetic substrate at its top end. A second main pole is in contact with the first main pole. This assembly is covered with a protective overcoat. A similar recording head is described in U.S. Pat. No. 5,225,953, also issued to T. Wada et al. on Jul. 6, 1993.

U.S. Pat. No. 4,974,110, issued to M. Kanamine et al. on Nov. 27, 1990, describes a perpendicular recording head having a main magnetic pole, a spiral coil surrounding the main pole, and a pair of auxiliary magnetic poles on either side of the main pole. The magnetic flux from the resulting two magnetic leakage paths and the coil cancel each other out, thereby reducing edge noise.

U.S. Pat. No. 4,985,792, issued to M. B. Boir on Jan. 15, 1991, and assigned to the assignee of the present inventors, describes an improved spindle motor for a fixed disk drive for a computer.

U.S. Pat. No. 5,073,836, issued to H. S. Gill et al. on Dec. 17, 1991, describes a perpendicular recording head. The primary magnetic pole is separated from the auxiliary pole by a distance sufficient to increase the reluctance of the recording head, thereby minimizing erasure of data within the recording medium.

U.S. Pat. No. 5,241,430, issued to D. W. Janz on Aug. 31, 1993, and assigned to the assignee of the present inventors, describes a disk drive which accepts write operations during manufacture, but only accepts read operations in use. The drive's controller responds to power supply voltage levels available to the user's computer by performing only read operations, but will perform a write operation in response to a higher voltage.

U.S. Pat. No. 5,430,589, issued to M. B. Moir et al. on Jul. 4, 1995, and assigned to the assignee of the present inventors, describes a disk drive having a vibration-absorbing insulator between the housing and the shaft for the storage disks.

U.S. Pat. No. 5,796,557, issued to G. N. Bagnell et al. on Aug. 18, 1998, and assigned to the assignee of the present inventors, describes a disk drive including six storage disks and fitting within a 3.5 inch, half height port.

U.S. Pat. No. 5,996,045, issued to L. Lee et al. on Nov. 30, 1999, and assigned to the assignee of the present inventors, describes a disk drive arrangement combining a master drive and a slave drive. Both drives use the same IDE bus. The host computer is able to send commands over the IDS bus in the same manner as if only one disk drive was present, and the command is then carried out by the appropriate drive.

The article, Sakhrat K. Khizroev, James A. Bain, and Mark H. Kryder, "Considerations in the design of Probe Heads for 100 Gbit/in$^2$ Recording Density," *IEEE Transactions on Magnetics* (September 1997) pp. 2893–2895, describes work performed by two inventors of the present invention towards development of giant magnetoresistive read heads capable of reading magnetic storage media having high storage densities.

The article, Jon William Toigo, "Avoiding a Data Crunch," *Scientific American* (May 2000) pp. 58–74, describes several approaches to increasing the information storage density within fixed computer drives.

None of the above described patents and publications describes a perpendicular recording head for use with magnetic recording media having a main pole formed by plating a nonmagnetic substrate with a magnetic surface covering. Additionally, none of the above patents and publications describes a recording head having the advantages provided by the present invention.

SUMMARY OF THE INVENTION

The present invention is a perpendicular recording head for use with magnetic recording media having an unusually thin main pole. The main pole is made by depositing a layer of magnetically permeable material on a nonmagnetic substrate, so that the deposited magnetic material forms the main pole. Although not limited to such use, a perpendicular recording head of the present invention is particularly useful for fixed (also known as hard) computer disk drives.

The perpendicular recording head includes a main pole, an opposing pole magnetically coupled through a joint to the main pole, and an electrically conductive coil surrounding or adjacent to the main pole. The bottom of the opposing pole has a surface area greatly exceeding the surface area of the main pole's bottom surface. Electrical current flowing through the coil creates a flux through the main pole. The direction of the flux may be reversed by reversing the direction of current flow through the coil.

A preferred and suggested method of making the main pole of the present invention begins by securing a nonmagnetic support to the joint, using well-known procedures, for example vacuum deposition. Next, a step topology is created between this substrate and the remainder of the recording head. This may be done by performing photolithography on one surface of the nonmagnetic support. The surface to be prepared is adjacent and perpendicular to the joint. Next, a magnetically permeable material is plated over the nonmagnetic substrate, so that the magnetically permeable plating forms the main pole. Due to the location of the plated surface relative to the joint, the main pole is thereby magnetically coupled with the opposing pole through the joint, oriented so that the plated surface will be parallel to the recording head's direction of travel. Preferred magnetically permeable platings are magnetically soft materials, such as permalloy, Ni/Fe, and nitrides. The thickness of the plating can be made as narrow as a few hundred Angstroms by merely controlling plating time.

A typical magnetic recording medium for use in conjunction with a perpendicular recording head includes an upper layer having a plurality of magnetically permeable tracks separated by nonmagnetic transitions, and a magnetically permeable lower level. The lower level is magnetically soft relative to the tracks.

To write to the magnetic recording medium, the recording head is separated from the magnetic recording medium by a distance known as the flying height. The magnetic recording medium is moved past the recording head so that the recording head follows the tracks of the magnetic recording medium, with the magnetic recording medium first passing under the opposing pole and then passing under the main pole. Current is passed through the coil to create magnetic flux within the main pole. The magnetic flux will pass from the main pole through the track, into the lower layer, and across to the opposing pole. The flux will thereby cause the magnetic fields in the tracks to align with the magnetic flux of the recording head. Changing the direction of electric current changes the direction of the flux created by the recording head and therefore the magnetic fields within the magnetic recording medium. Because the surface area of the opposing pole is significantly greater than the surface area of the main pole, only the main pole will have a sufficient concentration of magnetic flux to influence the magnetic fields in the magnetic recording medium.

Reading from the magnetic recording medium may follow the opposite procedure (inductive reading). The magnetic flux of the magnetic recording medium will pass through the main pole as the main pole is passed over the recording medium. Whenever there is a change in the magnetic fields of the recording medium, the flux within the main pole will change accordingly. Such changes in flux will induce a current within the coil.

Alternatively, a magnetoresistive or giant magnetoresistive (GMR) read head may be used with the present invention. A GMR head is made by creating a gap between the top and bottom portions of the main pole, and bridging the gap with a GMR read element. Magnetic flux flowing through the main pole will thereby be forced through the GMR read head. The magnetic flux of the magnetic recording medium will pass through the main pole as the main pole is passed over the recording medium. Whenever there is a change in the magnetic fields of the recording medium, the flux within the main pole will change accordingly. Such changes in flux will induce a current within the coil. The GMR read element will have a first electrical resistance corresponding with flux oriented in one direction, and a second electrical resistance corresponding with flux oriented in the opposing direction.

The present invention has the advantage of permitting increased information storage density within the magnetic recording medium. The density with which information may be recorded on the magnetic recording medium is limited by the effect of the recording head's magnetic flux on neighboring regions of the magnetic recording medium during read and write operations. Each discrete sector of the magnetic recording medium must be sufficiently distant from neighboring sectors so that magnetic flux from the recording head will only affect that sector which the recording head is directly over. The present invention minimizes this problem by using a head with a significantly narrower main pole than other perpendicular recording heads, thereby permitting narrower tracks to be used within the magnetic storage medium.

It is therefore an aspect of the present invention to provide a perpendicular recording head having an unusually thin main pole.

It is a further aspect of the present invention to provide a perpendicular recording head being dimensioned and configured to concentrate magnetic flux within a narrow portion of the magnetic recording medium.

It is another aspect of the present invention to provide a magnetic recording apparatus wherein information can be stored at greater densities.

It is a further aspect of the present invention to provide a method of manufacturing a perpendicular recording head adapted to permit recording on magnetic storage media at higher information densities than were available in the past.

It is another aspect of the present invention to provide a perpendicular recording head wherein the main pole is a magnetically permeable surface covering of a nonmagnetic substrate.

It is a further aspect of the present invention to provide a perpendicular recording head wherein the main pole is a magnetically permeable material plated over one surface of a nonmagnetic substrate.

These and other aspects of the invention will become more apparent through the following description and claims.

BRIEF DESCRIPTION OF THE DRAWINGS

Like reference numbers denote like elements throughout the drawings.

DETAILED DESCRIPTION OF THE PREFERRED EMBODIMENTS

The present invention is a perpendicular recording head for use with magnetic recording media. The recording head includes an unusually narrow main pole, made by a plating process. Perpendicular recording head main poles typically have thickness measured in a direction parallel to the tracks of the magnetic recording media, and a width defined perpendicular to the tracks of the magnetic recording medium. Platings typically have a thickness measured from the surface of the substrate to the surface of the plating. Therefore, the width of the main pole corresponds to the thickness of the plating. As used herein, recording head means a head adapted for read and/or write operations.

Figure 1:
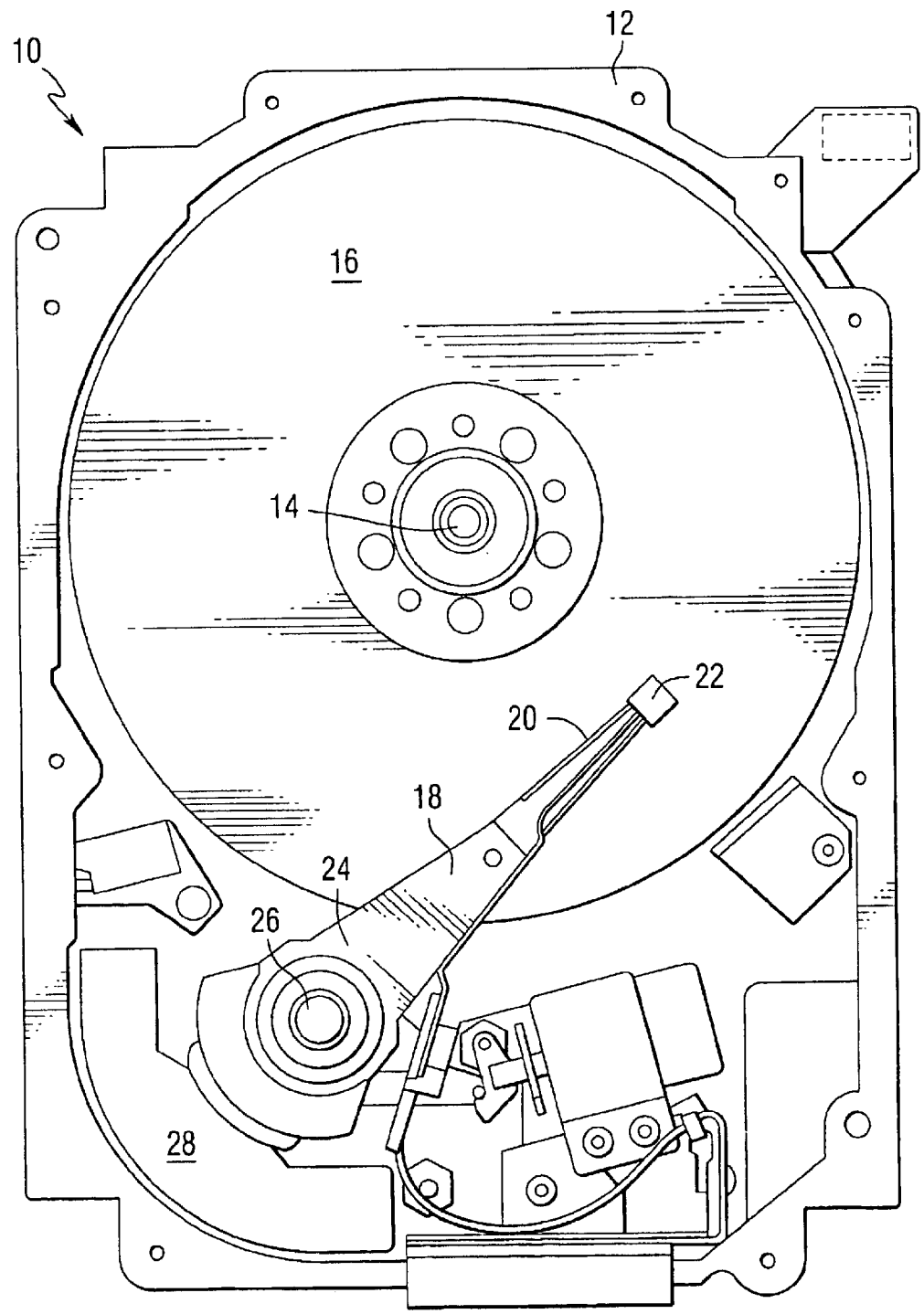
FIG. 1 is a top view of a typical hard disk drive for a computer for which the present invention may be used, illustrating the disk drive with its upper housing portion removed.

The invention will most commonly be used within a fixed disk drive 10 for computers, one of which is illustrated in FIG. 1. The fixed disk drive 10 includes a housing 12 (with the upper portion removed and the lower portion visible in this view for maximum clarity) dimensioned and configured to contain and locate the various components of the disk drive 10. The disk drive 10 includes a spindle motor 14 for rotating at least one magnetic storage medium 16 within the housing, in this case a magnetic disk. At least one arm 18 is contained within the housing 12, with each arm 18 having a first end 20 with a perpendicular recording head 22, and a second end 24 pivotally mounted to a bearing 26. An actuator motor 28, such as a movable coil DC motor, is located at the arm's second end 24, pivoting the arm 18 to position the head 22 over a desired sector of the disk 16. The actuator motor 28 is regulated by a controller which is not shown, and which is well known.

Figure 2:
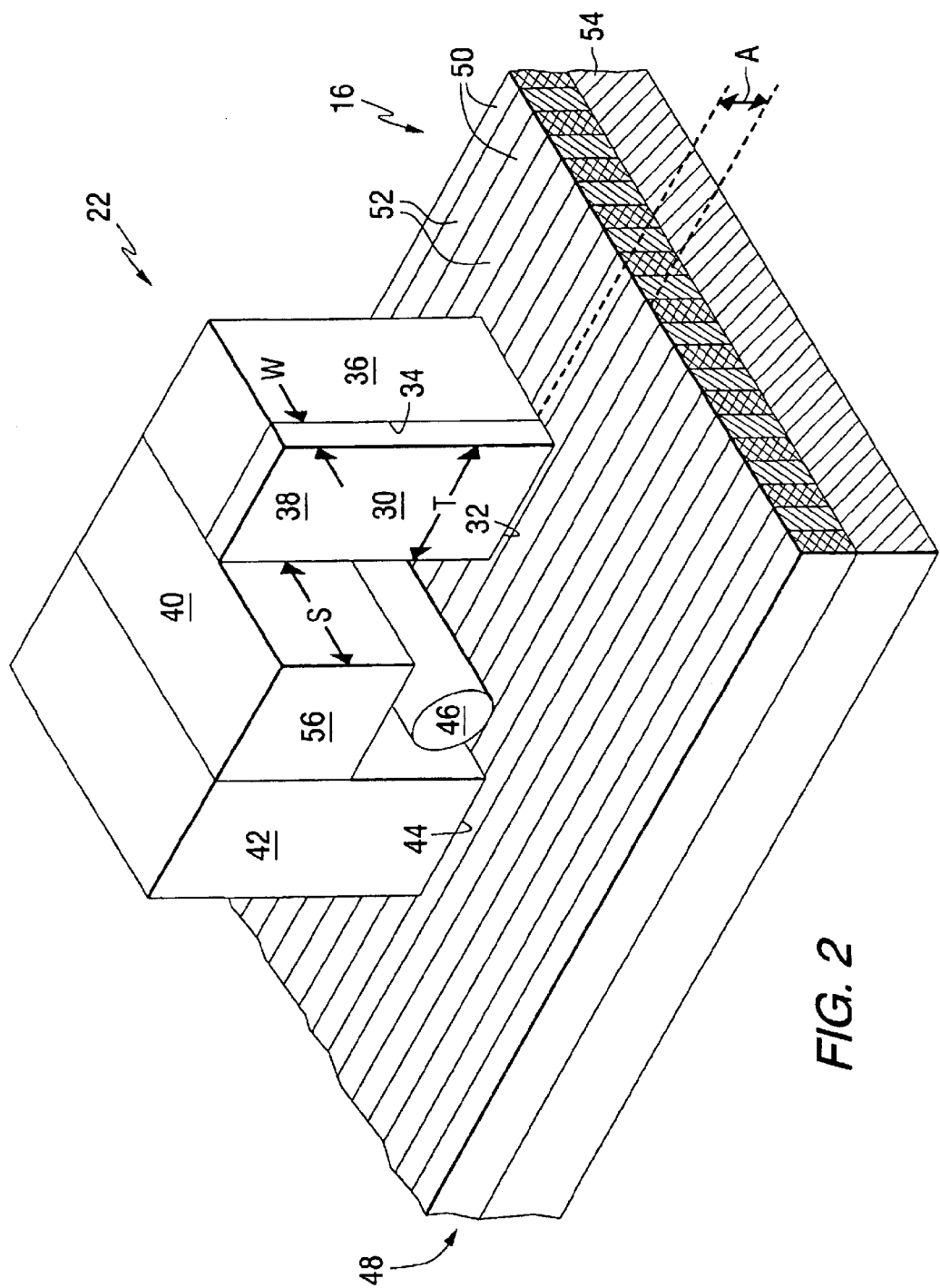
FIG. 2 is a perspective, partially sectional view of a perpendicular recording head according to the present invention.

The features of a perpendicular recording head 22 and corresponding magnetic storage disk 16 are best illustrated in FIG. 2. The perpendicular recording head 22 includes means for concentrating magnetic flux onto a small surface area of a magnetic recording medium, here a magnetically permeable main pole 30, oriented substantially perpendicular to the magnetic recording medium 16, and having a tip 32. The main pole 30 of the present invention is a magnetically permeable surface covering formed on surface 34 of nonmagnetic substrate 36, with the main pole 30 having a width W and thickness T. The substrate 36 is secured to a magnetically permeable joint 40, and is dimensioned and configured so that the surface 34 forms a step topology with respect to the surface 56, with a step distance S defined between the surface 56 and the main pole 30. The top 38 of the main pole 30 is thereby magnetically coupled to the joint 40. The opposite end of the joint 40 has a magnetically permeable opposing pole 42 secured to it. The opposing pole 42 includes a bottom surface 44 having a significantly larger surface area than the tip 32 of the main pole 30. With the exception of the joint 40, the main pole 30 and opposing pole 42 are separated by nonmagnetic material (not shown, but well known). An electrically conductive coil 46 is positioned adjacent to, and may surround, the main pole 30, so that the coil 46 is sufficiently close to the main pole 30 to induce a magnetic field within the main pole 30 when current passes through the coil 46. Although not shown and well understood by those skilled in the art, the coil 46 is connected to a power supply capable of supplying electrical current flowing in either direction through the coil 46, and controlled by an appropriate controller for changing the current direction as necessary to produce the desired changes in the orientation of the main pole's magnetic field.

Figure 4:
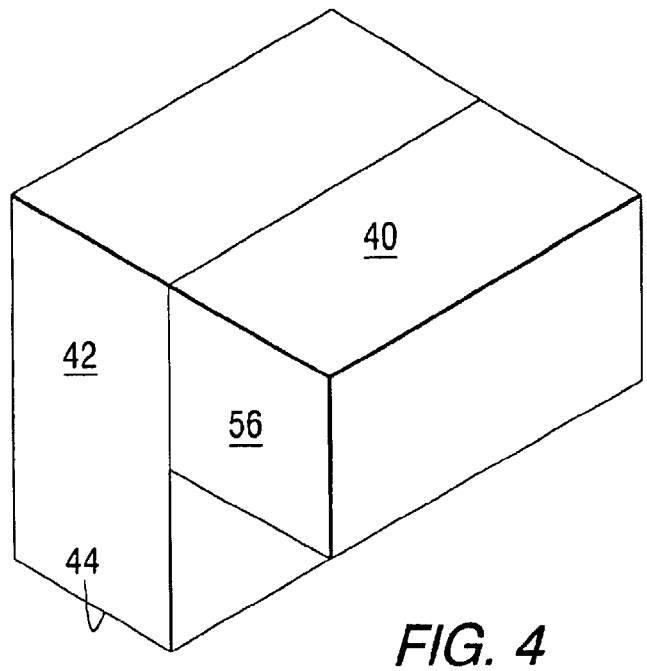
FIG. 4 is a perspective view of an opposing pole and joint for a perpendicular recording head according to the present invention.
Figure 5:
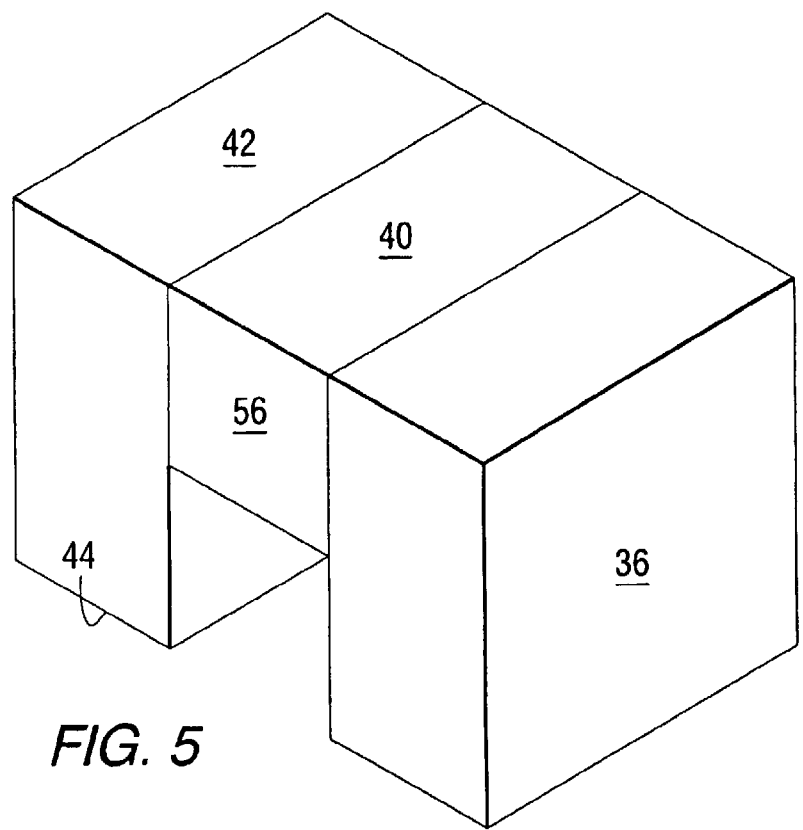
FIG. 5 is a perspective view of an opposing pole and for a perpendicular recording head according to the present invention joint after addition of the substrate material.
Figure 6:
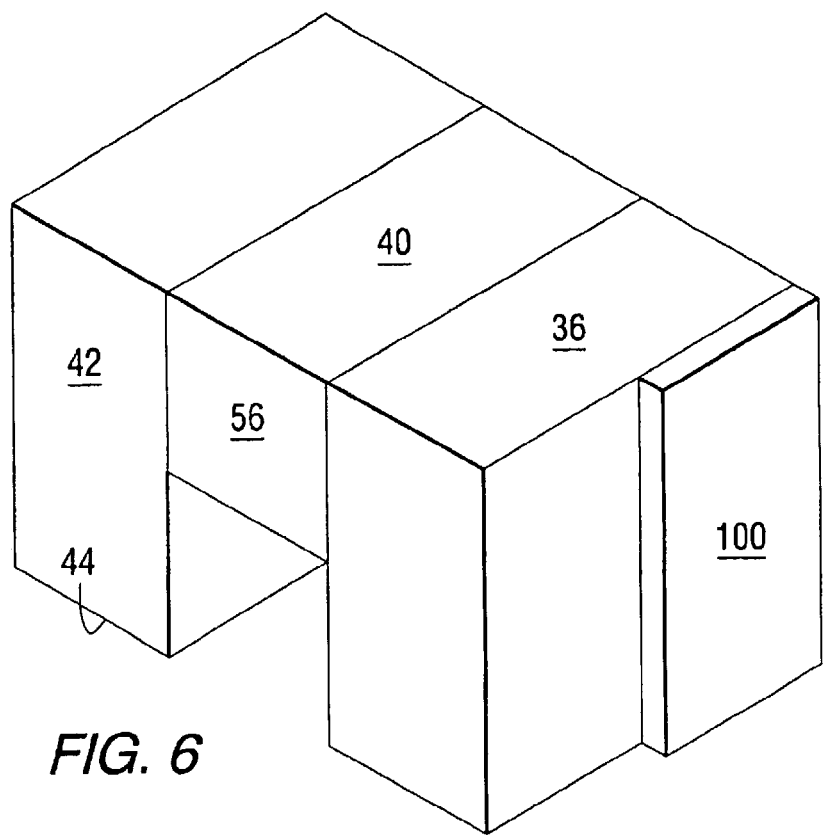
FIG. 6 is a perspective view of an opposing pole, joint, and substrate material for a perpendicular recording head according to the present invention after addition of photoresist.
Figure 7:
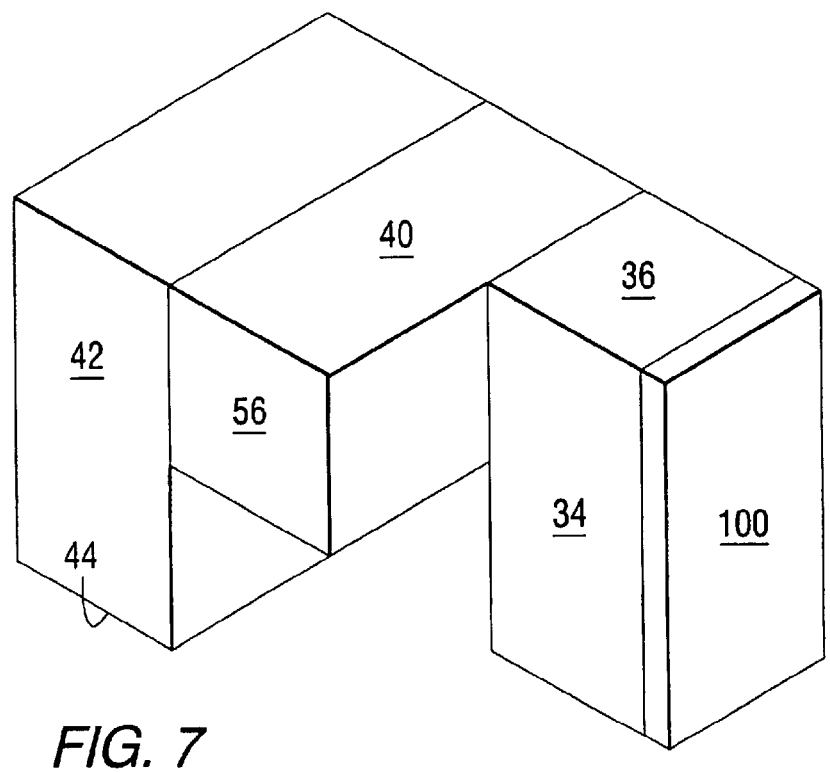
FIG. 7 is a perspective view of an opposing pole, joint, substrate, and photoresist for a perpendicular recording head according to the present invention after removal of excess substrate material.
Figure 8:
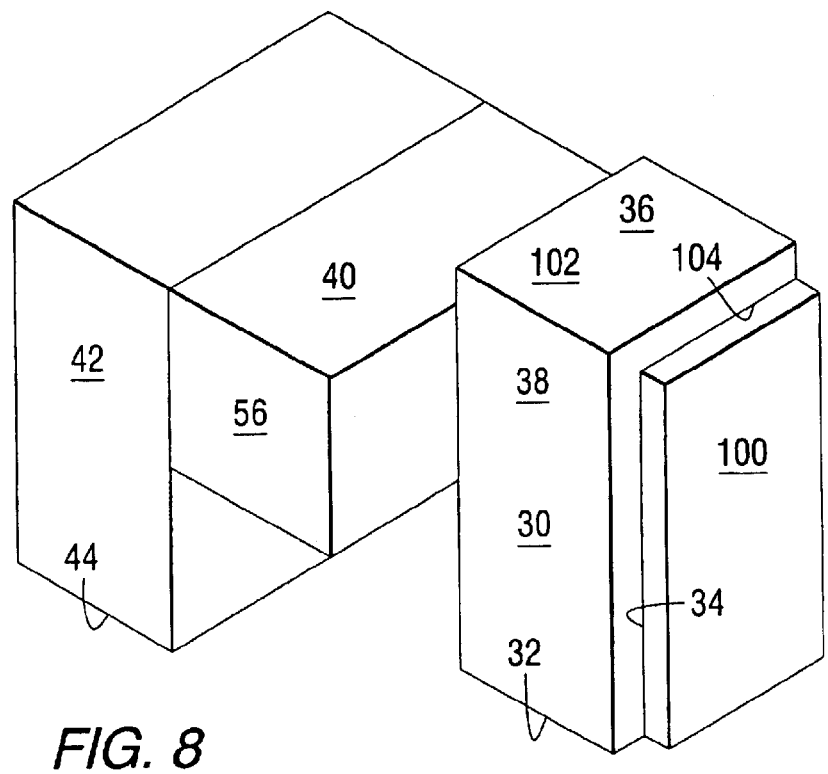
FIG. 8 is a perspective view of an opposing pole, joint, substrate, and photoresist for a perpendicular recording head according to the present invention after plating of the substrate with magnetically permeable material.
Figure 9:
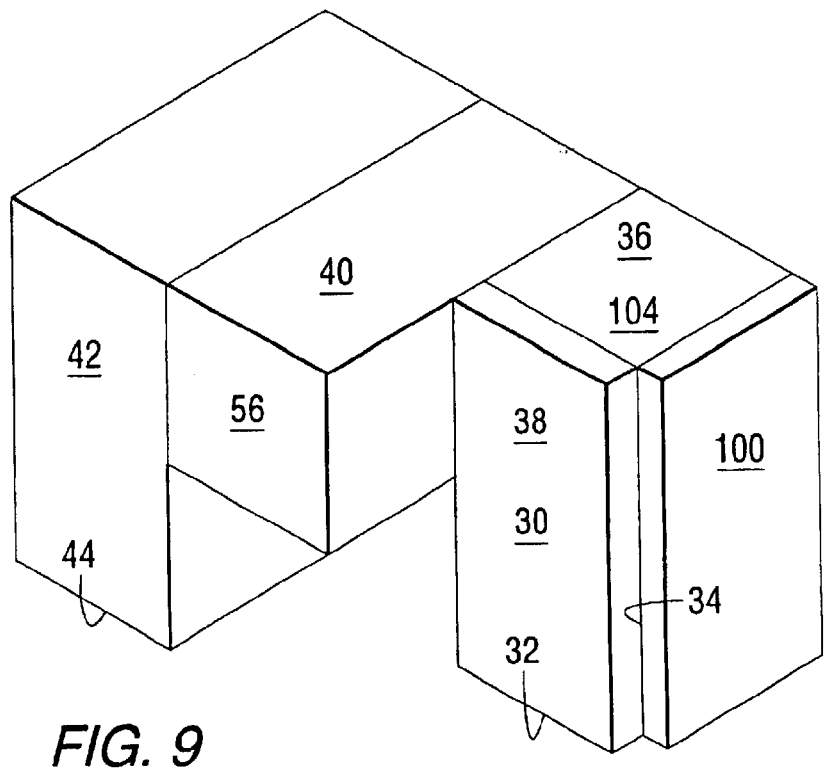
FIG. 9 is a perspective view of an opposing pole, joint, substrate, and photoresist for a perpendicular recording head according to the present invention after removal of excess plating.
Figure 10:
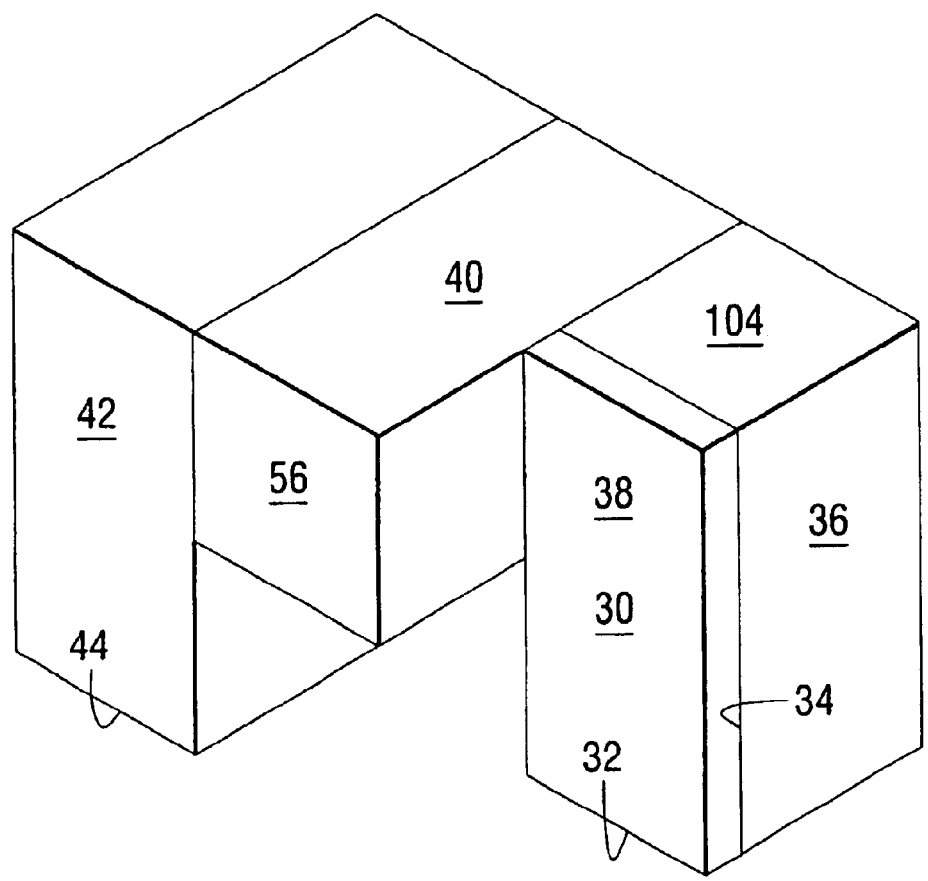
FIG. 10 is a perspective view of an opposing pole, joint, substrate, and photoresist for a perpendicular recording head according to the present invention after removal of the photoresist.

Referring to FIGS. 4–10, a preferred and suggested method of making the main pole 30 begins by securing the nonmagnetic support 36 to the joint 40 (FIGS. 4–5). Processes for joining the nonmagnetic support 36 to the joint 40 are well known, and may include, for example, sputtering of the substrate material on the joint 40. A preferred material for the substrate 36 is copper. The thickness T of the main pole 30 may be controlled by controlling the amount of substrate material deposited to form substrate 36, and will preferably be minimized. A step topology is then created between the surface 34 of support 36 and the surface 56, preferably by photolithography. As illustrated in FIG. 6, that portion of support 36 which will ultimately remain is covered by photoresist 100 before the undesirable material is etched from the substrate 36, as in FIG. 7. The surface 34 has thereby been formed, and is preferably adjacent and substantially perpendicular to the joint 40, terminating at the joint 40. Next, a magnetically permeable material is deposited on the surface 34, preferably by electroplating, as illustrated in FIG. 8, until the desired width W (plating thickness) is reached. The plating 102 on the top surface 104 of the substrate 36 is removed by chemical/mechanical polishing, and the photoresist 100 is removed (FIGS. 9–10). This magnetically permeable material now forms the main pole 30. Because the surface 34 is adjacent to and terminates at the joint 40, the main pole 30 abuts the joint 40, and is thereby magnetically coupled with the joint 40. Preferred materials for the main pole 30 are magnetically soft materials, for example, permalloy, Ni/Fe, and nitrides. The thickness of the main pole 30 may be controlled by varying the plating time.

A typical trackwidth for other magnetic recording media is approximately 1000 nm, and a main pole made by other methods generally can not be made narrower than 300 nm. By making a main pole in this manner, the main pole 30 can be made with a width W below 300 nm, and possibly as low as 20 nm to 30 nm. The thickness T of the main pole, controllable by varying the amount of substrate 36 deposited, will typically be between 100 nm to 1000 nm.

Although the plated surface described herein is surface 34, any surface of the substrate 36 perpendicular to the magnetic recording medium 16 may be plated to form the main pole 30.

Also illustrated in FIG. 2, a magnetic storage medium 16, here a magnetic disk, for use with a perpendicular recording head 22 is illustrated. The disk 16 includes an upper layer 48 having a plurality of magnetically permeable tracks 50, which are divided into sectors, with each sector having several different magnetic fields within the magnetically permeable material (not shown and well understood). The tracks 50 are separated by nonmagnetic transitions 52. The disk 16 also includes a magnetically permeable lower layer 54, which is magnetically soft relative to the tracks 50. In use, the disk 16 will be separated from the tip 32 of main pole 30 by a flying height A. The flying height A is sufficiently small so that a high concentration of flux from main pole 30 will pass through track 50, but sufficiently large to prevent damage to disk 16 from contact with recording head 22.

Recording is accomplished by rotating the disk 16 relative to the recording head 22 so that the recording head 22 is located above the appropriate sectors of the tracks 50. As recording progresses, the disk 16 will first pass under the opposing pole 42, then the main pole 30. Current will be supplied to the coil 46, thereby inducing a magnetic field within the main pole 30. The greatest concentration of flux from this magnetic field will pass from the tip 32 of the main pole 30 through the track 50 directly under the main pole 30 on which recording is being carried out, the lower layer 54, through a different track 50 directly under the opposing pole 42, continuing through the opposing pole 42 and the joint 40, and finally forming a complete loop back through the top 38 of the main pole 30. As a portion of a sector of the track 50 passes under the main pole 30, the orientation of its magnetic field will correspond to the orientation of the magnetic field of the main pole 30, which will be perpendicular to the disk 16. As the main pole 30 passes over the disk 16, the direction of current passing through the coil 46 will remain constant when a binary "0" is being recorded, thereby creating consistent orientation of the magnetic field within the track 50. The current passing through the coil 46 will reverse directions when a binary "1" is being recorded, thereby changing the orientation of the magnetic field within the track 50. The opposing pole 42 does not affect the magnetic fields within the upper layer 48 because the large surface area relative to the main pole 30 results in a significantly lower flux concentration through the opposing pole 42 than through the main pole 30.

Reading from the disk 16 may be accomplished either using the same head 22, or with a separate, identical read head adjacent to the write head 22, or with a different style read head that may also benefit from a concave pole tip, as explained below. If the same head or another identical head is used for reading and writing, then reading is accomplished by rotating the disk 16 relative to the recording head 22 so that the desired sectors of the tracks 50 pass under the main pole 30. As the main pole 30 passes over a magnetic field within a track 50, the flux from the magnetic field passes through the track 50, through the main pole 30, joint 40, opposing pole 42, through another track 50, (at a much lower flux density due to the larger surface area of opposing pole 42 relative to main pole 30), and back through lower layer 54 to the track 50 from which reading is taking place. The main pole 30 will therefore receive a magnetic field with a flux direction corresponding to the flux direction of that portion of the track 50 directly under the main pole 30. When the main pole 30 is passing over a region of the track 50 with a uniform flux direction, no current is induced in the coil 46, thereby resulting in a binary "0" being read. When the main pole 30 passes over a section of the track 50 wherein the magnetic flux reverses direction, a current is induced in the coil 46, thereby resulting in a binary "1" being read.

Figure 3:
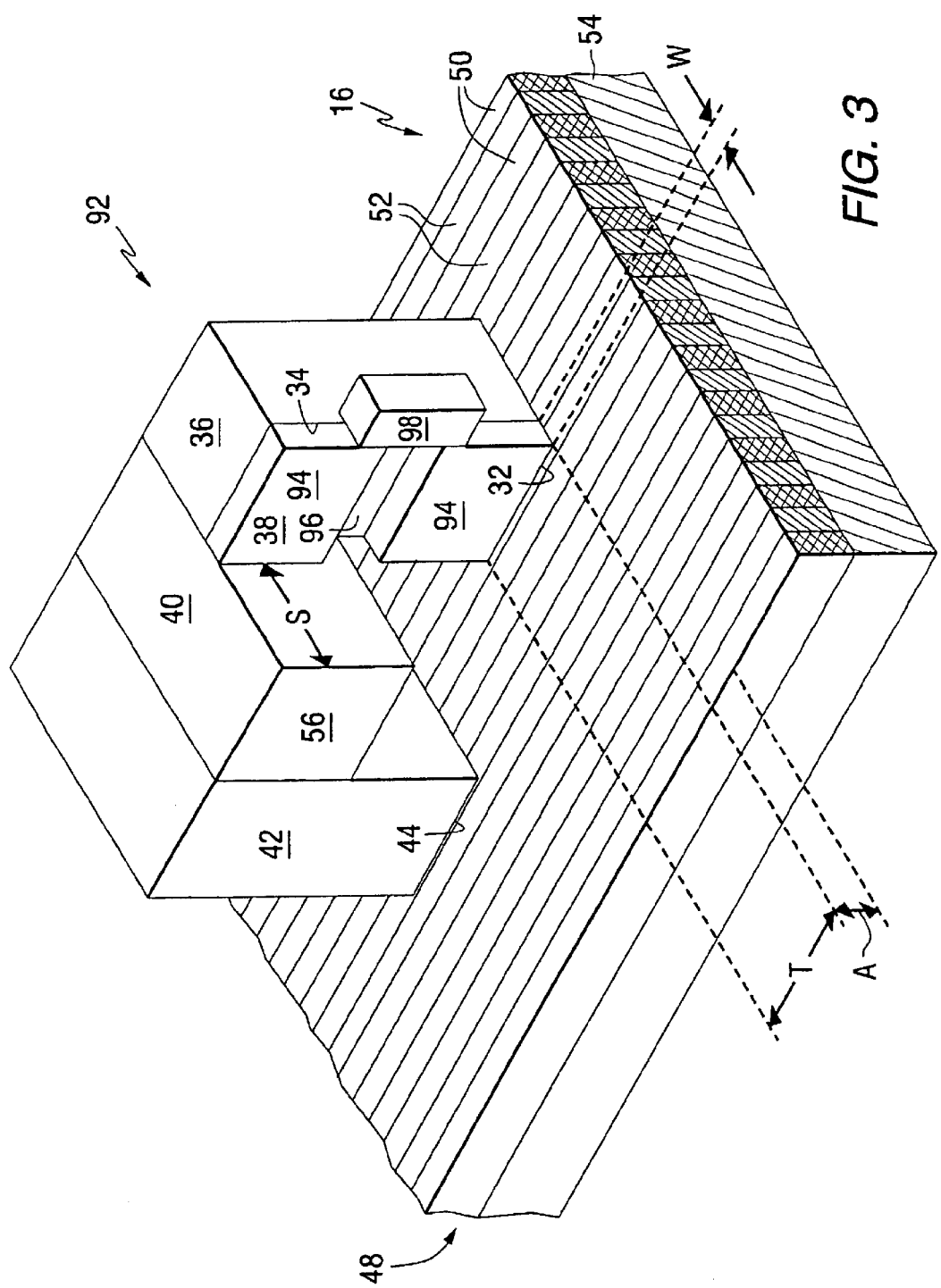
FIG. 3 is a perspective, partially sectional view of a perpendicular GMR read head according to the present invention.

Alternatively, a magnetoresistive (hereinafter MR) or giant magnetoresistive (hereinafter GMR) read head 92 may be included at the first end 20 of the arm 18, immediately adjacent to the write head 22. GMR read heads are well known, but will be described briefly herein for purposes of illustrating the advantages of the present invention as applied to GMR read heads. A GMR read head 92 incorporating the present invention is illustrated in FIG. 3. The GMR read head 92 includes a magnetically permeable main pole 94, oriented substantially perpendicular to the magnetic recording medium 16, and including a tip 32. A main pole 94 of the present invention is a magnetically permeable surface covering formed on the surface 34 of the nonmagnetic substrate 36. The substrate 34 is secured to a magnetically permeable joint 40, and is dimensioned and configured so that the surface 34 forms a step topology with the remainder of the recording head 22. The top 38 of the main pole 94 is thereby magnetically coupled to the joint 40. The center 96 of the main pole 94 is split, separating the top 38 from the tip 32 with nonmagnetic material. The top 38 and tip 32 are magnetically bridged by a GMR read element 98, so that magnetic flux will flow between the top 38 and tip 32 by passing through the GMR read element 98. The opposite end of the joint 40 has a magnetically permeable opposing pole 42 secured to it. The opposing pole 42 includes a bottom surface 44 having a significantly larger surface area than the bottom surface 36 of the main pole 30. With the exception of the joint 40, the main pole 30 and opposing pole 42 are separated by nonmagnetic material (not shown, but well known). Although not shown and well understood by those skilled in the art, the head 92 is connected to and controlled by an appropriate controller for properly reading from the magnetic storage medium 16.

As before, reading is accomplished by rotating the disk 16 relative to the read head 92 so that the desired sectors of the tracks 50 pass under the main pole 30. As the main pole 94 passes over a magnetic field within a track 50, the flux from the magnetic field passes through the track 50, through the main pole 94, joint 40, opposing pole 42, through another track 50, (at a much lower flux density due to the larger surface area of opposing pole 42 relative to main pole 92), and back through lower layer 54 to the track 50 from which reading is taking place. The main pole 94 will therefore receive a magnetic field with a flux direction corresponding to the flux direction of that portion of the track 50 directly under the main pole 30. Because the main pole 94 is split, the magnetic flux flowing through the main pole 94 is forced through the GMR read element 98. Changes in magnetic flux within the main pole 94 will change the electrical resistance within the GMR read element 98. For example, magnetic flux oriented in a first direction will produce a first level of electrical resistance within the GMR element 98. Reversing the direction of magnetic flux will produce a second level of magnetic resistance within the GMR element 98. A constant level of resistance will be read as a binary "0." Likewise, a change in resistance will be read as a binary "1."

From the above description, it becomes apparent that, if the individual magnetic fields are too close to each other within the upper layer 48, the process of writing to the magnetic storage medium 16 will affect not only the desired location on the disk, but also neighboring locations. Therefore, minimizing the thickness of the main pole 30 will minimize the area of the upper layer 48 affected by magnetic flux from the main pole 30. The tracks 50 may therefore be thinner, thereby permitting a greater number of tracks 50 within a disk, and allowing the disk to store additional information.

It is to be understood that the invention encompasses not only the preferred embodiments described herein but also all embodiments encompassed by the following claims.

We claim:

1. A perpendicular recording head comprising:
   a nonmagnetic substrate having a surface oriented in a plane substantially parallel with tracks of a magnetic recording medium; and
   a main pole comprising a layer of magnetically permeable material plated on the surface of the substrate defining a plane substantially parallel with the tracks of the magnetic recording medium and substantially perpendicular to a plane defined by the magnetic recording medium.

2. The perpendicular recording head according to claim 1, wherein said magnetically permeable material is electroplated.

3. The perpendicular recording head according to claim 1, wherein said nonmagnetic substrate defines a step topology within said recording head.

4. The perpendicular recording head according to claim 1, further comprising an electrically conductive coil adjacent to said main pole, said electrically conductive coil being electrically connected with a power supply.

5. A perpendicular recording head according to claim 1, wherein said head is a write head.

6. A perpendicular recording head according to claim 1, wherein said head is a magnetoresistive read head.

7. A perpendicular recording head according to claim 1, wherein said head is a giant magnetoresistive read head.

8. The perpendicular recording head according to claim 1, wherein said main pole has a width defined in a direction perpendicular to the tracks of a magnetic recording medium, and said width is from 20 to 300 nm.

9. The perpendicular recording head according to claim 1, wherein said main pole is made from a material selected from the group consisting of permalloy, Ni/Fe, and nitrides.

* * * * *